May 3, 1927. Re. 16,611
L. L. LEWIS
METHOD OF AND APPARATUS FOR COOLING AND VENTILATING
Original Filed Dec. 22, 1924
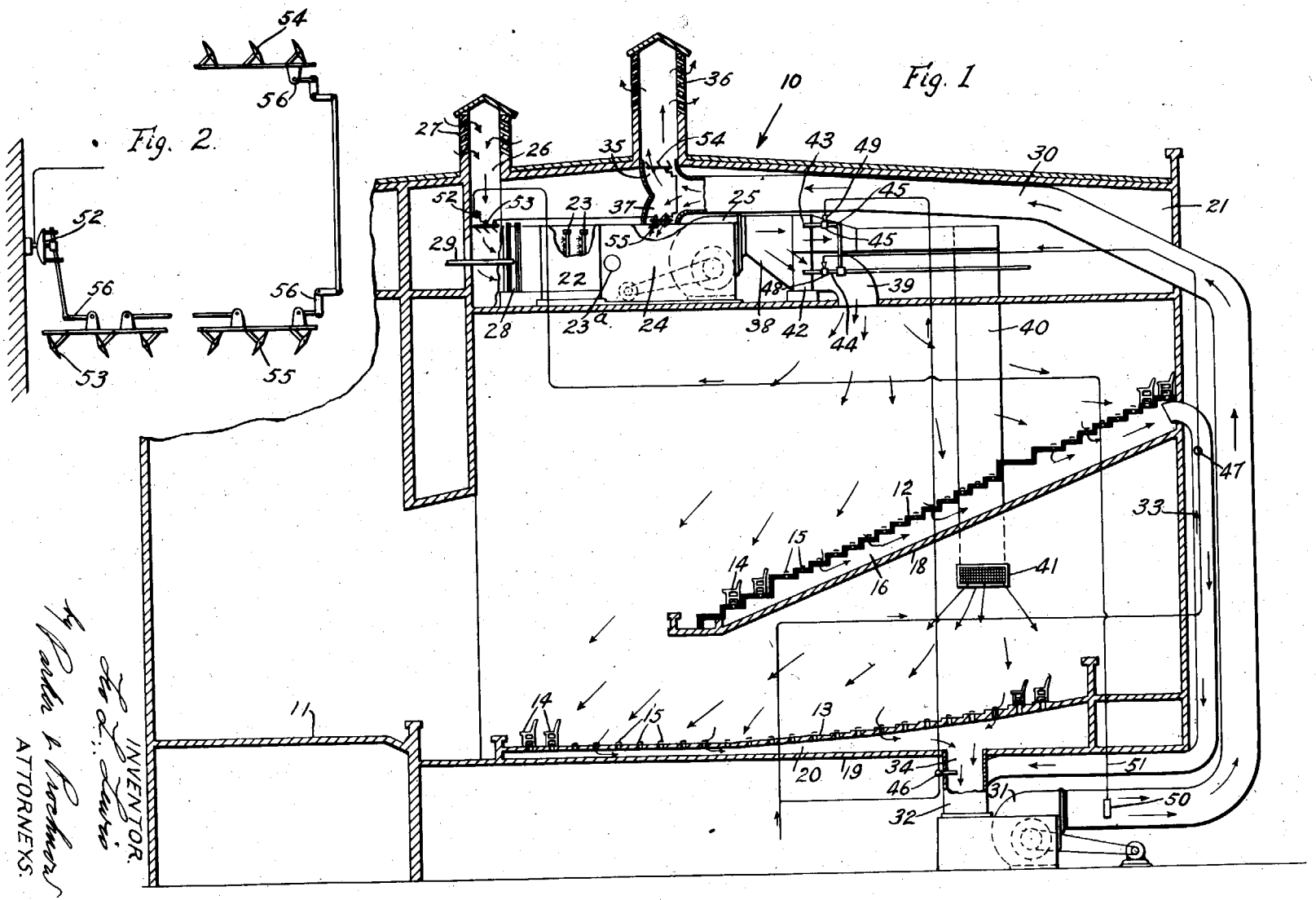
INVENTOR.
Leo L. Lewis
by Parker & Prochnow
ATTORNEYS.

Reissued May 3, 1927.

Re. 16,611

UNITED STATES PATENT OFFICE.

LEO L. LEWIS, OF PLAINFIELD, NEW JERSEY, ASSIGNOR TO CARRIER ENGINEERING CORPORATION, OF NEWARK, NEW JERSEY.

METHOD OF AND APPARATUS FOR COOLING AND VENTILATING.

Original No. 1,583,060, dated May 4, 1926, Serial No. 757,389, filed December 22, 1924. Application for reissue filed February 12, 1927. Serial No. 167,854.

This invention relates to the cooling and ventilating of rooms or buildings and has reference more particularly to a method of and apparatus for cooling and ventilating which is especially adapted to be used in rooms or buildings where people congregate, such as theaters, auditoriums, assembly rooms, schools, and other enclosures occupied by people in considerable numbers.

For the greatest comfort of people assembled in such places, it is desirable to maintain a comparatively low relative humidity of the air, preferably not greater than about 50 percent, since a high relative humidity causes greater discomfort than a lower relative humidity with a higher temperature. It is also desirable, especially in the summer months to maintain the room temperature and humidity as low as practicable and keep the air circulating so as to quickly absorb the heat and moisture from the bodies and exhalations of the people in the room. It is also important that the air admitted through the supply ducts or the like near persons in the room should not have a temperature more than about 8 degrees lower than the average room temperature or said air current will cause discomfort to the individuals.

In ventilating and cooling systems for similar purposes, as heretofore designed, the greater part of the air which is recirculated is passed through a dehumidifier where its temperature is reduced as much as 25 degrees to 30 degrees below the dry bulb temperature in the room in order to reduce the relative humidity of the air which has been unduly raised as a result of the moisture respired and evaporated from the bodies of the people in the room. As the air at this low temperature was too cold to reintroduce into the room containing the people without discomfort to the latter, said air had to be reheated at additional expense so that the system is expensive to operate as to cost of refrigeration and heating. This method moreover, requires the operation of a boiler during the summer season, which is objectionable.

An object of this invention is to produce a practical and efficient cooling and ventilating system for theaters and other enclosures in which people congregate in considerable numbers, in which a desirable temperature and relative humidity are maintained in the enclosure regardless of the number of people therein, and in which the air for ventilating and cooling is supplied to the enclosure with the greatest comfort to the people therein.

Other objects of the invention are to produce an efficient cooling and ventilating system which is economical in operation, and can be installed with a minimum initial investment; also to provide a cooling and ventilating system in which the bulk of the air is recirculated without being conditioned, and only a small part of the air supplied to the enclosure is taken from the outside and conditioned or dehumidified and then mixed with the recirculated air, thus saving in refrigeration, and eliminating the necessity of means for reheating the air during the summer months; also to provide a system of the class described, in which the conditioned or dehumidified air is perfectly blended or mixed with the recirculated air to produce a mixture having a sufficiently high temperature so as not to produce discomfort to the occupants when the mixed air is introduced into the enclosure; also to cause the requisite amount of vitiated air containing moisture evaporated and respired from the persons to be discharged out of the enclosure instead of being passed through the dehumidifier, thus saving in refrigeration; also to provide a system of the class described in which the admission of fresh air from the outside and the relief of vitiated air from the enclosure are automatically regulated so as to maintain the desired conditions of temperature and relative humidity in the enclosure, and also to improve cooling and ventilating methods and apparatus in other respects hereinafter specified and claimed.

In the accompanying drawings:

Fig. 1 is a diagrammatic sectional elevation of a building equipped with apparatus embodying my invention for carrying out my improved cooling and ventilating method.

Fig. 2 is a diagrammatic view of the damper mechanism thereof.

The drawings illustrate an arrangement of apparatus suitable for a theater building 10, of ordinary construction, having a stage 11, a balcony 12, and a main auditorium 13. The balcony 12 and auditorium 13 are provided, as usual, with seats 14 under which are shown ventilators of the mushroom type 15 connected by openings through the floor to a ventilating chamber or passage 16 under the balcony 12 and to a corresponding ventilating passage or chamber 20 under the auditorium.

In the preferred arrangement illustrated, the air conditioning or cooling apparatus is located in a chamber or space 21 above the balcony, and the air is introduced at the upper portions of the occupied spaces and withdrawn at the floors. It should be understood, however, that the arrangement may be reversed and the air introduced at the lower portions of the occupied spaces and exhausted at the upper portions thereof. With the arrangement shown, however, considerably less air is necessary for the proper ventilation of the enclosure. In some cases the decorations in the building or other structural features would prevent the location of the apparatus as shown.

According to my improved ventilating and cooling method, the greater portion of the air, preferably not less than about 75 percent of the air withdrawn from the enclosure is recirculated and returned to the enclosure, the remaining smaller portion being allow to escape into the atmosphere. The air thus exhausted into the atmosphere is replaced by taking a corresponding volume of fresh air from the outside and dehumidifying or conditioning the fresh air to the required dew point, so that by then mixing this conditioned air with the warmer recirculated air, a resultant air mixture having a temperature of about 72 degrees F. and a sufficiently low relative humidity is obtained, and this mixed air is admitted into the enclosure.

The heat given off by each person in the room amounts to approximately 4 B. t. u. per minute and there will be respired from and evaporated from the body of each person about 0.1 pound of water per hour. The volume of air supplied to the enclosure, therefore, is such that by properly regulating the proportions of conditioned and recirculated air, the temperature in the enclosure will not increase above 80° F. and the relative humidity will not exceed about 50 percent notwithstanding the heat and moisture given off by the people in the room. It should be noted that the maximum difference in temperature between the incoming and out-going air is approximately 8 degrees, which is not sufficient to cause discomfort to the people in the room. It is important that a low relative humidity be maintained, preferably not exceeding about 50 percent, especially during the summer months when a high relative humidity is more oppressive than a high temperature. The proportions of fresh air and recirculated air can be varied over fairly wide limits and in fact the apparatus to be described is adapted to automatically vary these proportions to suit the changing conditions from an empty room to a room which is full of people.

For the purpose of securing the required low dewpoint of the fresh air admitted, an air conditioning device or dehumidifier 22 of known type is employed, in which the air is conditioned by contact with water sprays 23. In warm weather, when it is necessary to cool and dehumidify the air, the spray water is cooled by suitable refrigeration apparatus, not shown. The air conditioner 22 is equipped with a dew point control indicated at 23ª of any known or suitable type adapted to regulate the temperature in the conditioner, so that the air leaving the same will have the required predetermined dew point. For example, during the summer months when dehumidification is required, this control is adapted to regulate the volume of refrigerated water admitted to the sprays, while during the winter months the control is adapted to regulate the supply of steam for heating the spray water. Dew point controls of this nature are well known. From the dehumidifier 22, the air passes through a mixing chamber 24 connected to the suction side of a main blower or fan 25. The dehumidifier 22 is connected by a duct 26 to a fresh air inlet, such for example, as an air admission tower 27 preferably located on the roof of the building, and a heater or tempering coil 28 is preferably located between the duct 27 and dehumidifier 22, said heater being supplied by steam through a pipe 29 so as to temper the air from the outside before it enters the dehumidifier. This tempering coil is simply to relieve the work of the usual automatic dew point control of the dehumidifier 22, and is only necessary in cold weather. The steam admitted through the pipe 29 can be controlled either by hand or automatically by a thermostat located in the fresh air duct 26, as desired.

The cool fresh air passing through the dehumidifier 22 passes into the mixing chamber 24 where it is preferably mixed with a much larger volume of the air withdrawn from the room and returned through a duct 30. The duct 30 connects at one end with the discharge of a blower 31, which is connected to a suction duct 32. The duct 32, as shown has a branch 33 leading from the exhaust chamber 16 of the balcony 12 and a branch 34 leading from the exhaust chamber 20 of the auditorium 13.

The other end of the return duct 30 has a branch 35 leading to a relief tower 36, preferably located on the roof of the building, and a second branch 37 connecting with the mixing chamber 24 so that the recirculated air or the required portion thereof can be thoroughly mixed with the fresh air passing into the mixing chamber 24 through the dehumidifier 22. The mixing of the two grades of air is made more complete by passing the mixture through the blower 25, the churning action of which accomplishes a perfect mixture. The discharge duct 38 of the blower 25 is provided with a branch pipe 39 which delivers its air into the upper portion of the space above the balcony 12, and a second branch 40 connected to a register or outlet 41 located so as to deliver air into the upper part of the auditorium.

In the summer months it will ordinarily not be necessary to heat the air after passing through the blower 25 owing to the fact that the mixture of the small percentage of cold fresh air with the larger percentage of recirculated air produces a resultant temperature of the mixed air which is suitable for admission into the room. However, in the winter months it may be necessary to heat the air delivered to the room, and for this purpose a heater 42 is provided in the supply duct 39, and a heater 43 in the duct 40, said heaters being supplied by steam through pipes 44 and 45 respectively. A thermostat 46 is provided in the exhaust duct 34 and a thermostat 47 is located in the exhaust duct 33 from the balcony 12. A diaphragm valve 48 is provided on the steam pipe 44 and a diaphragm valve 49 on the steam pipe 45, said diagphragm valves being connected by air lines or otherwise to the thermostats 47 and 46 respectively so that the temperature of air exhausted from the balcony and auditorium regulates automatically and independently the temperature of air introduced to said balcony and auditorium. Any other suitable thermostatic regulating means for similarly controlling the heaters could be employed.

For controlling the relative humidity in the room, a suitable hygrostat or device 50 responsive to changes in humidity is positioned preferably in the return duct 30, so as to be influenced by the air exhausted from the room. This hygrostat 50 is operatively connected as by an air pressure line 51, with a motor 52 which is connected by actuating mechanism to dampers 53, 54 and 55 controlling respectively the fresh air admission duct 26, the relief air duct 35 and the branch return duct 37 connecting with the mixing chamber 24. The dampers can be of any suitable kind and the connections between the motor 52 and the dampers 53, 54 and 55 can be of any sort such as the lever, link and rod connections 56 shown in Fig. 2, whereby when the motor 52 closes the dampers 53, the dampers 54 will also simultaneously and correspondingly close and the dampers 55 will open, and vice versa. Thus the motor 52 operates to admit an amount of fresh air to the dehumidifier which may be equal to the amount of air discharged into the atmosphere through the relief duct 35, and when the fresh air inlet damper is closed the relief damper will destrably also be closed and all of the air (except if desired, a predetermined small minimum) will be recirculated and returned to the room without being conditioned.

In the operation of the system, the two thermostats 46 and 47 are set at the minimum temperature, which preferably would be about 68°, and this minimum temperature would be maintained so long as the house or enclosure remains empty, or when it contains only a very few people. The hygrostat 50 is adjusted to control at the desired relative humidity which ordinarily will be 45 percent to 50 percent, say 50 percent. When the enclosure is empty, the dew point of the air in it will be determined by the point at which the dew point control of the dehumidifier 22 is set. If the hygrostat 50 is set for 50 percent relative humidity, and the thermostats 46, 47 set for a minimum temperature of 68° F., then the dew point control of the dehumidifier would be set for 49° F., which is the dew point required for the fresh air leaving the dehumidifier 24 to produce 50 percent relative humidity at 68° in the enclosure. With no people in the house, all of these controls would be in equilibrium and dampers 53, 54 would be closed or nearly closed, so that no fresh air would be admitted, or else possibly only a predetermined minimum supply which might be as little as 10 percent of the total volume handled by fan 25.

The effect which would be caused by people entering either the auditorium or the balcony would be two fold; first to raise the temperature of the air, due to bodily heat, and second, to increase the dew point due to the moisture evaporated from their bodies and carried by respired air. Both of these conditions affect the air passing over the hygrostat 50. The rise in dry bulb temperature tends to reduce the relative humidity of the air, and the increase in dew point tends to offset that reduction, but the effect of the change in the dry bulb temperature is much greater than the other. When the hygrostat 50 is so affected, it is thrown out of equilibrium and opens the dampers 53 and 54 the necessary amount and correspondingly closes the dampers 55 so that a greater volume of fresh air is admitted through the dehumidifier 22. This gives a greater cooling capacity to absorb the additional heat and offsets the moisture given off by the people. As the number of people increases, the dampers 53 and 54 will be gradually opened more and more until the full capacity of the dehumidifier 22 has been reached. The hygrostat 50 functions in the same manner, regardless of whether steam has been turned on in heaters 42 and 43, or not. These heaters, which are controlled by thermostats 46 and 47, do not come into operation until the hygrostat 50 has reduced the amount of air admitted through dampers 53 and relieved through dampers 54 to a minimum predetermined point. If the temperature then continues to fall, thermostats 46 and 47 function when it reaches 68° F., admitting a sufficient volume of steam to the heaters 42 and 43 to maintain this temperature of 68° F.

In general, the function of the various controls is to automatically vary the volume of air admitted for ventilation in direct ratio to the number of people in the enclosure. In doing this, it also varies the amount of refrigeration required in like manner, because it varies the volume of fresh air admitted and the dew point control and dehumidifier keeps the dew point constant. In like manner, in cold weather, when it is necessary to add moisture to the fresh air, instead of dehumidifying the air in order to obtain the required dew point in the fresh air, it varies the amount of steam required for heating the spray water or otherwise causes the necessary increase in temperature in the device 22, which under these conditions operates as a humidifier instead of as a dehumidifier.

Comfortable air conditions can be thus automatically maintained for any enclosure in which human beings assemble. The amount of refrigeration necessary is reduced to a minimum, as only the comparatively small volume of fresh air from the outside passes through the air conditioner or dehumidifier, and the air ladened with moisture from the people is relieved into the atmosphere without the necessity for condensation of this moisture in the dehumidifier. The cold air from the dehumidifier is perfectly blended or mixed with the recirculated air so as to avoid cold streaks in the air, and the resultant temperature of the air introduced into the room is not sufficiently low to cause discomfort to the people therein. Thus, comfortable air conditions in the enclosure are produced most economically and with a smaller initial investment than with other systems. The reheating of cold, dehumidified air is entirely eliminated during the summer months so that the annoyance and expense of operating a boiler during the summer is avoided and the heat of the people is utilized for the reheating of the dehumidified cold air.

I claim as my invention:

1. The method of ventilating an enclosure in which people assemble, which includes withdrawing air from said enclosure, conditioning fresh air to provide air having a dew point lower than the dew point of the withdrawn air, mixing said conditioned fresh air with air withdrawn from the enclosure and delivering the mixed air to the enclosure, and varying the proportions of said fresh air in the mixture in accordance with changes in the number of people in the enclosure.

2. The method of ventilating an enclosure in which people assemble, which includes withdrawing air from said enclosure, conditioning a volume of fresh air smaller than the volume of air withdrawn from the enclosure to provide air having a dew point lower than the dew point of the withdrawn air, mixing said conditioned air with air withdrawn from the enclosure and delivering the mixed air to the enclosure, and regulating the volume of fresh air which is conditioned and mixed with the withdrawn air under the control of the relative humidity in the enclosure.

3. The method of ventilating an enclosure in which people assemble, which includes withdrawing air from said enclosure, dehumidifying fresh air to reduce its dew point below that of the withdrawn air, mixing said dehumidified air with air withdrawn from the enclosure and delivering the mixed air to the enclosure, and regulating the volume of fresh air which is dehumidified and mixed with the withdrawn air in accordance with changes in the number of people in the enclosure.

4. The method of ventilating an enclosure in which people assemble, which includes withdrawing air from said enclosure, dehumidifying fresh air and maintaining a substantially constant dew point thereof below that of the withdrawn air, mixing said dehumidified air with air withdrawn from the enclosure and delivering the mixed air to the enclosure, and regulating the volume of fresh air which is dehumidified and mixed with the withdrawn air under the control of the relative humidity in the enclosure.

5. The method of cooling and ventilating an enclosure in which people assemble which includes continuously withdrawing air from said enclosure for recirculation, permitting a portion of said air to be relieved into the outside atmosphere, mixing the remainder of said air with fresh air from the outside which corresponds substantially in volume with the relieved air and is dehumidified and cooled before mixture with said withdrawn air, and introducing the mixed air into the room.

6. The method of cooling and ventilating an enclosure in which people assemble, which includes continuously withdrawing air from said enclosure for recirculation, permitting a portion of said air to be relieved into the outside atmosphere, mixing the remainder of said air with fresh air which is admitted from the outside and is dehumidified and cooled before mixing with the withdrawn air, introducing the mixed air into the room, and regulating the amount of air relieved into the atmosphere and the amount of fresh air taken from the atmosphere under the control of the relative humidity in the enclosure.

7. The method of ventilating an enclosure in which people assemble, which includes withdrawing air from said enclosure, conditioning fresh air to provide air having a dew point lower than the dew point of the withdrawn air, mixing said conditioned fresh air with air withdrawn from the enclosure, and delivering the mixed air to the enclosure, varying the proportions of said fresh air in the mixture in accordance with changes in the number of people in the enclosure, and regulating the temperature of the mixed air delivered into said enclosure under control of the temperature of the air withdrawn from said enclosure.

8. The method of cooling and ventilating an enclosure in which people assemble, which includes continuously withdrawing air from said enclosure for recirculation, permitting a portion of said air to be relieved into the outside atmosphere, mixing the remainder of said air with fresh air which has been admitted from the outside and is dehumidified and cooled before mixing with the withdrawn air, introducing the mixed air into the enclosure, controlling the minimum temperature of the air introduced into said enclosure under the control of the temperature of the air withdrawn from said enclosure, and controlling the maximum temperature and relative humidity in the enclosure hygrostatically under control of the humidity of the air withdrawn from said enclosure.

9. The method of cooling and ventilating an enclosure in which people assemble, which includes withdrawing air from said enclosure, recirculating and returning to the enclosure at least a portion of said withdrawn air, mixing fresh air from the outside with said withdrawn air after said fresh air has been cooled and dehumidified and delivering the mixed air to the enclosure, and regulating the proportions of said returned air and dehumidified air so that the temperature of mixed air introduced into said enclosure is not more than substantially 8° F. lower in temperature than the temperature in said enclosure.

10. In an apparatus for ventilating an enclosure, the combination of an air dehumidifier having an inlet for outside fresh air, a mixing chamber connected with the outlet of said dehumidifier, a fan connected between said mixing chamber and said enclosure for drawing fresh air through said dehumidifier and mixing chamber and delivering the same to said enclosure, a second fan for withdrawing air from said enclosure, a return air passage connecting the discharge of said second fan to said mixing chamber, means for the relief of air from said enclosure to the outside atmosphere, means for varying the admission of fresh air to said dehumidifier, and means for correspondingly varying the relief of air from said enclosure.

11. In an apparatus for ventilating an enclosure, the combination for an air dehumidifier having an inlet for outside fresh air, a mixing chamber connected with the outlet of said dehumidifier, a fan for drawing fresh air through said dehumidifier and mixing chamber, branch air passages connecting the discharge of said fan to different portions of said enclosure, a second fan and suction connections for withdrawing air from said different portions of said enclosure, a return air passage connecting the discharge of said second fan to said mixing chamber, means for the relief of air from said enclosure to the outside atmosphere, means for varying the admission of fresh air to said dehumidifier, and means for correspondingly varying the relief of air from said enclosure.

12. In an apparatus for ventilating an enclosure, the combination of an air dehumidifier having an inlet for outside fresh air, a mixing chamber connected with the outlet of said dehumidifier, a fan for drawing fresh air through said dehumidifier and mixing chamber, branch air passages connecting the discharge of said fan to different portions of said enclosure, a second fan and suction connections for withdrawing air from said different portions of said enclosure, a return air passage connecting the discharge of said second fan to said mixing chamber, means for the relief of air from said enclosure to the outside atmosphere, heaters in said branch air passages, thermostats in said suction connections respectively controlling said heaters, a hygrostat in said return air passage, and mechanism controlled thereby for varying the admission of fresh air to the dehumidifier and correspondingly varying the relief of air from said enclosure.

13. The method of ventilating and providing desired atmospheric conditions in an enclosure in which people assemble, which includes conditioning fresh outside air to provide air having a dew point below the dew point of the air in the enclosure, mixing air withdrawn from the enclosure with said outside air after the latter is conditioned, introducing into the enclosure the mixed outside and withdrawn air, and permitting the relief from the enclosure of volumes of the air thereof substantially corresponding with the volumes of outside air which are conditioned and introduced into the enclosure.

14. In an apparatus for ventilating and providing desired atmospheric conditions in an enclosure in which people assemble, the combination with said enclosure of means for permitting relief of air therefrom in restricted quantities, an air dehumidifier having an inlet for outside fresh air, a mixing chamber in communication with the outlet of said dehumidifier, means between said mixing chamber and the enclosure for causing fresh air to be drawn through the dehumidifier and mixing chamber and insuring the delivery thereof into the enclosure and also for returning air from the enclosure to said mixing chamber wherein it is mixed with the dehumidified air passing therethrough, and means for varying the admission of fresh air to said dehumidifier.

15. The method of ventilating and providing desired atmospheric conditions in an enclosure wherein people assemble, which includes the mixing together of two bodies of air having different dew point conditions, one of said bodies being air withdrawn from the enclosure and the other of said bodies being fresh outside air, causing one of said bodies of air to be conditioned before said mixing of the air bodies to provide a dew point therein below the dew point of the air in the enclosure, delivering the mixed air so produced into the enclosure, permitting the relief from the enclosure of volumes of air substantially corresponding with the volumes of outside air which are introduced into the enclosure, and continuing the said steps to provide a substantially continuous operation in respect to the air supplied to the enclosure.

16. In an apparatus for ventilating and providing desired atmospheric conditions in an enclosure in which people assemble, the combination with said enclosure of means for permitting relief of air therefrom in restricted quantities, an air dehumidifer, a blower between the dehumidifier and enclosure for forcing conditioned air into the enclosure, an air chamber in communication with the suction side of the blower, conduits for delivering two currents of air into the air chamber wherein they are mixed, one of said conduits extending to the enclosure for receiving air therefrom and the other extending to the outside atmosphere for receiving fresh air, and wherein further, the conduits are arranged to cause one of the currents of air to be passed through the dehumidifier to lower its dew point below the air in the enclosure and to cause the other of the currents of air to be delivered directly to the air chamber on the suction side of the blower without passing through the dehumidifier, and means for varying the amount of air admitted to said dehumidifier.

17. In an apparatus for ventilating and providing desired atmospheric conditions in an enclosure in which people assemble, the combination with said enclosure of means for permitting relief of air therefrom in restricted quantities, an air dehumidifier, means for producing two currents of air and after mixing them delivering the air mixture into the enclosure, means for causing one of said air currents to be supplied from the enclosure and the other from the outside fresh air, conduit means for causing one of the air currents to be drawn through the dehumidifier prior to being mixed with the other air current, and means for varying the volume of the air current passing through the dehumidifier.

LEO L. LEWIS.